United States Patent
Shi et al.

(10) Patent No.: US 10,003,599 B2
(45) Date of Patent: Jun. 19, 2018

(54) METHOD AND TERMINAL DEVICE FOR KID MODE

(71) Applicant: Xiaomi Inc., Beijing (CN)

(72) Inventors: Dalong Shi, Beijing (CN); Kun Ma, Beijing (CN); Jinbin Lin, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days. days.

(21) Appl. No.: 14/597,224

(22) Filed: Jan. 15, 2015

(65) Prior Publication Data

US 2015/0350215 A1 Dec. 3, 2015

Related U.S. Application Data

(63) Continuation of application No. PCT/CN2014/089217, filed on Oct. 22, 2014.

(30) Foreign Application Priority Data

May 30, 2014 (CN) .......................... 2014 1 0240563

(51) Int. Cl.
*H04L 29/06* (2006.01)
*H04L 29/08* (2006.01)
(Continued)

(52) U.S. Cl.
CPC ........ *H04L 63/101* (2013.01); *G06F 21/6218* (2013.01); *G06Q 10/101* (2013.01);
(Continued)

(58) Field of Classification Search
CPC .... G06F 3/0488; G06F 3/04817; G06F 21/62; G06F 21/629; G06F 17/30699;
(Continued)

(56) References Cited

U.S. PATENT DOCUMENTS

2006/0259543 A1* 11/2006 Tindall ................. H04L 12/585
709/203
2008/0020803 A1 1/2008 Rios et al.
(Continued)

FOREIGN PATENT DOCUMENTS

| CN | 1738265 A | 2/2006 |
| CN | 1781301 A | 5/2006 |

(Continued)

OTHER PUBLICATIONS

"International Search Report for PCT/CN2014/089217".
"Extended European Search Report for 15162675.1".

*Primary Examiner* — Brian F Shaw
(74) *Attorney, Agent, or Firm* — Jun He Law Offices P.C.; James J. Zhu

(57) ABSTRACT

The disclosure relates to a method and a terminal device for processing an application in a kid mode, and the disclosure belongs to the field of Internet technology. The method includes receiving a list of allowed functions or a list of prohibited functions of a target application from a first terminal device, determining allowed functions in the target application according to the list of allowed functions or the list of prohibited functions, and displaying the allowed functions in a kid mode of the target application. Therefore, according to the present disclosure, normal usage of applications is not affected in the kid mode.

13 Claims, 12 Drawing Sheets

(51) Int. Cl.
*G09B 7/00* (2006.01)
*G06Q 10/10* (2012.01)
*G06Q 50/00* (2012.01)
*G09B 5/00* (2006.01)
*G06F 21/62* (2013.01)
*H04M 1/67* (2006.01)
*H04W 4/20* (2018.01)

(52) U.S. Cl.
CPC ............... *G06Q 50/01* (2013.01); *G09B 5/00* (2013.01); *G09B 7/00* (2013.01); *H04L 63/102* (2013.01); *H04L 63/1408* (2013.01); *H04L 67/10* (2013.01); *H04M 1/67* (2013.01); *H04W 4/206* (2013.01); *G06F 2221/2141* (2013.01); *G06F 2221/2149* (2013.01)

(58) Field of Classification Search
CPC ....... G06F 17/30867; G06F 2221/2149; G06F 2221/2115; H04N 21/4542; H04N 21/4318; G10L 15/08; G10L 2015/088; G10L 21/00; G11B 27/031
See application file for complete search history.

(56) References Cited

U.S. PATENT DOCUMENTS

| | | | |
|---|---|---|---|
| 2008/0254767 A1 | 10/2008 | Jin | |
| 2009/0183226 A1* | 7/2009 | Dean | G06F 21/62 726/1 |
| 2009/0197569 A1* | 8/2009 | Gaznaghi | H04M 3/54 455/410 |
| 2010/0146118 A1* | 6/2010 | Wie | H04L 67/306 709/225 |
| 2012/0158468 A1 | 6/2012 | Wheeler | |
| 2012/0291102 A1* | 11/2012 | Cohen | G06F 21/629 726/4 |
| 2013/0040604 A1* | 2/2013 | Sprigg | H04L 51/12 455/410 |
| 2013/0097668 A1 | 4/2013 | Park et al. | |
| 2013/0184073 A1* | 7/2013 | Uchiyama | A63F 13/12 463/29 |
| 2014/0136607 A1* | 5/2014 | Ou | H04L 67/18 709/203 |
| 2015/0095014 A1* | 4/2015 | Marimuthu | G06F 17/2735 704/9 |

FOREIGN PATENT DOCUMENTS

| | | |
|---|---|---|
| CN | 101340210 A | 1/2009 |
| CN | 101640765 A | 2/2010 |
| CN | 101753702 A | 6/2010 |
| CN | 101764853 A | 6/2010 |
| CN | 101834949 A | 9/2010 |
| CN | 103108082 A | 5/2013 |
| CN | 103136472 A | 6/2013 |
| CN | 103347116 A | 10/2013 |
| CN | 103442141 A | 12/2013 |
| CN | 103442330 A | 12/2013 |
| CN | 103797760 A | 5/2014 |
| CN | 104063655 A | 9/2014 |
| JP | 2008027424 A | 2/2008 |
| JP | 2008097485 A | 4/2008 |
| JP | 2008257722 A | 10/2008 |
| JP | 2009520294 A | 5/2009 |
| JP | 2011103622 A | 5/2011 |
| JP | 2011211694 A | 10/2011 |
| JP | 2012021851 A | 2/2012 |
| JP | 2012216944 A | 11/2012 |
| JP | 2014030157 A | 2/2014 |
| KR | 1020050095591 A | 9/2005 |
| KR | 1020140054218 A | 5/2014 |
| RU | 2009141833 A | 5/2011 |
| WO | 2005/034560 A1 | 4/2005 |
| WO | 2013/010147 A1 | 1/2013 |
| WO | 2013/023175 A1 | 2/2013 |

* cited by examiner

METHOD AND TERMINAL DEVICE FOR KID MODE

CROSS REFERENCE TO RELATED APPLICATIONS

This application is a Continuation of International Application No. PCT/CN2014/089217 with an international filing date of Oct. 22, 2014, which is based upon and claims priority to Chinese Patent Application No. 201410240563.8, filed on May 30, 2014, the entire contents of which are incorporated herein by reference.

TECHNICAL FIELD

The present disclosure generally relates to the field of Internet technology, and more particularly, to a method and a terminal device for processing an application in a kid mode.

BACKGROUND

With the development of wireless communication technology, the popularity of mobile phones is increasing. Many children have their own mobile phones, and use applications on the mobile phone to make friends, play games, browse WebPages and so on. However, there are many varieties of information on the internet, which kids are likely to be deceived from or may be exposed to information adverse to their physical and mental growth when using applications, as a result of their lack of discretion of information and poor self-control ability. Thus, it is needed to control the kids' usage of such applications.

Currently, kids' usage of applications may be controlled according to the details of the following. A kid mode is provided, then parents may turn on the kid mode by entering a password, once the kid mode is turned on, corresponding applications are disabled, and only when the correct password is entered, the kid mode can be turned off and the corresponding applications can be launched.

SUMMARY

Embodiments of the disclosure provide a method and a terminal device for processing an application in a kid mode, which may allow normal usage of applications not to be affected in the kid mode. The disclosure includes technical solutions as follows.

In an aspect, a method for processing an application in a kid mode is provided, the method including: receiving, from a first terminal device, a list of allowed functions or a list of prohibited functions of a target application, determining allowed functions in the target application according to the list of allowed functions or the list of prohibited functions, and displaying the allowed functions in a kid mode of the target application.

In another aspect, a terminal device for processing an application in a kid mode is provided, the device including: a processor; and a memory for storing instructions executable by the processor, wherein the processor is configured to perform: receiving, from a first terminal device, a list of allowed functions or a list of prohibited functions of a target application; determining allowed functions in the target application according to the list of allowed functions or the list of prohibited functions; and displaying the allowed functions in a kid mode of the target application.

In further another aspect, a non-transitory computer-readable storage medium is provided, the non-transitory computer-readable storage medium having stored therein instructions that, when executed by one or more processors of a terminal device, cause the terminal device to perform: receiving, from a first terminal device, a list of allowed functions or a list of prohibited functions of a target application, determining allowed functions in the target application according to the list of allowed functions or the list of prohibited functions, and displaying the allowed functions in a kid mode of the target application.

According to the present disclosure, normal usage of the application is not affected in the kid mode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention, but are not used to limit the disclosure.

Illustrated embodiments of the present disclosure are shown by the above figures, and more detailed illustration will be described hereinafter. The figures and descriptive text are not intended to limit the scope of the disclosed concept in any manner, but are to explain the concepts of the disclosure to those skilled in the art with reference to specific embodiments.

DETAILED DESCRIPTION

Detailed description of the present disclosure will be further made with reference to embodiments and accompanying drawings in order to make the objects, technical solutions and advantages of the present disclosure more apparent. The exemplary embodiments of the disclosure and illustrations thereof serve to explain but not to limit the disclosure.

The embodiments of the disclosure provide a method and a terminal device for processing an application in a kid mode, which are illustrated in detail hereinafter with reference to the accompanying drawings.

Figure 1:
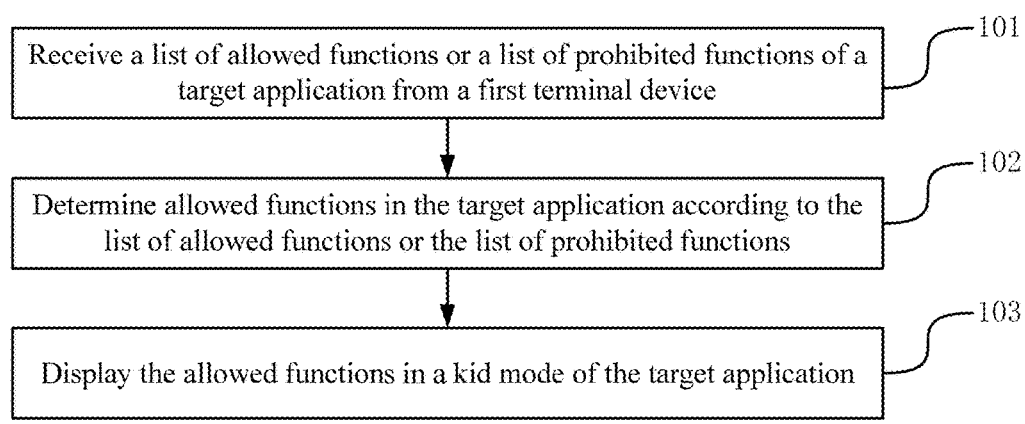
FIG. 1 is a flow chart of a method for processing an application in a kid mode according to an exemplary embodiment.

An embodiment of the disclosure provides a method for processing an application in a kid mode as shown in FIG. 1. The method includes the following steps.

In step 101, a list of allowed functions or a list of prohibited functions of a target application is received from a first terminal device.

In step 102, allowed functions in the target application are determined according to the list of allowed functions or the list of prohibited functions.

In step 103, the allowed functions are displayed in a kid mode of the target application.

In the embodiment of the disclosure, the method includes receiving the list of allowed functions or the list of prohibited functions of the target application from the first terminal device, determining the allowed functions of the target application according to the list of allowed functions or the list of prohibited functions, displaying the allowed functions in the kid mode of the target application. By the processing manner above, normal usage of the application is not affected in the kid mode.

An embodiment of the disclosure provides a method for processing an application in a kid mode. An executing body of the method may be a terminal device (which may be called a second terminal device), such as a mobile phone, a tablet computer and other portable terminal devices. The second terminal device may be a kid-used terminal device, and the below-mentioned first terminal device may be a parent-used terminal device. In the embodiment, a mobile phone is taken as an example as the executive body to illustrate the technical solutions in detail. Other executive bodies are similar to the mobile phone, which are not illustrated hereinafter for concise purpose.

The process flow shown in FIG. 1 is illustrated hereinafter in detail with embodiments, the content of which may be as follows.

In step 101, a list of allowed functions or a list of prohibited functions of a target application is received from the first terminal device. The method in the embodiment may be implemented in the second terminal device.

The target application may be various applications installed on the second terminal device, such as an instant messaging application, webpage browsing software, video software and so on. The list of allowed functions may be a list recording allowed functions of the target application and including at least one allowed function. The list of prohibited functions may be a list recording prohibited functions of the target application, including at least one prohibited function.

In practical use, both the first terminal device and the second terminal device have the target application. The target application may provide a parent control function. In the first terminal device, a user (i.e., a parent) turns on the parent control function, then the first terminal device may display a list of functions of the target application, and the list of functions may include all functions of the target application, such as instant messaging function, adding contact function, joining group function and so on. The parent may select the allowed functions in the list of functions to form the list of allowed functions and send the list of allowed functions to the second terminal device, or may select the prohibited functions in the list of functions to form the list of prohibited functions and send the list of prohibited functions to the second terminal device.

For example, the list of functions provided by an application developer or a server system includes the instant messaging function, adding contact function and joining group function, etc. The user of the first terminal device selects the instant messaging function and the adding contact function from the list of functions as the allowed functions. The instant messaging function and the adding contact function form the list of allowed functions, which is sent to the second terminal device.

In step 102, the allowed functions of the target application are determined according to the list of allowed functions or the list of prohibited functions. The method of the embodiment may be used in wireless terminal devices.

In the embodiment, for the list of allowed functions, the second terminal device may obtain the functions in the list of allowed functions and take them as the allowed functions. The functions, which are not listed in the list of allowed functions, are taken as the prohibited functions. For the list of prohibited functions, the second terminal device may obtain the functions, which are not listed in the list of prohibited functions from all functions of the target application, and take them as the allowed functions.

In step 103, in a kid mode of the target application, the allowed functions are displayed. The method in the embodiment may be used in the wireless terminal devices.

Figure 2A:
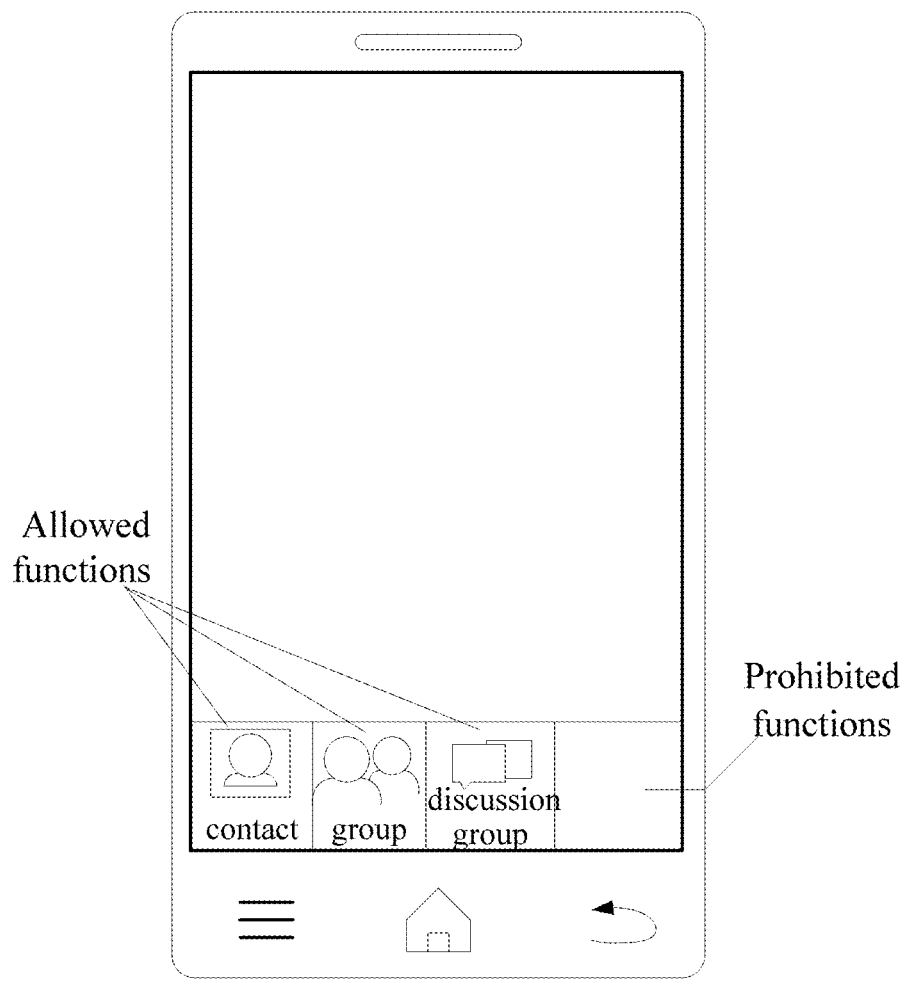
FIG. 2a is a schematic diagram of a display content shown on a terminal interface according to an exemplary embodiment.

In practical use, the target application may be provided with a button for turning on the kid mode, the user (i.e., the parent) may click the button to turn on the kid mode and set a password for turning off the kid mode. After the kid mode is turned on, execution buttons of the allowed functions may be displayed in the target application, as shown in FIG. 2a. At that moment, execution buttons corresponding to other functions may not be displayed. However, the execution buttons corresponding to the other functions may also be displayed based on different settings of the parent.

Optionally, in the embodiment of the disclosure, it is also possible to block some characters in the information displayed in the second terminal device. The corresponding process may be: when detecting that a content to be displayed in the target application includes a predetermined first character, blocking the first character in the content to be displayed. The method in the embodiment may be used in the wireless terminal devices.

The first character may be sensitive words or words unfit for kids to read.

Figure 2B:
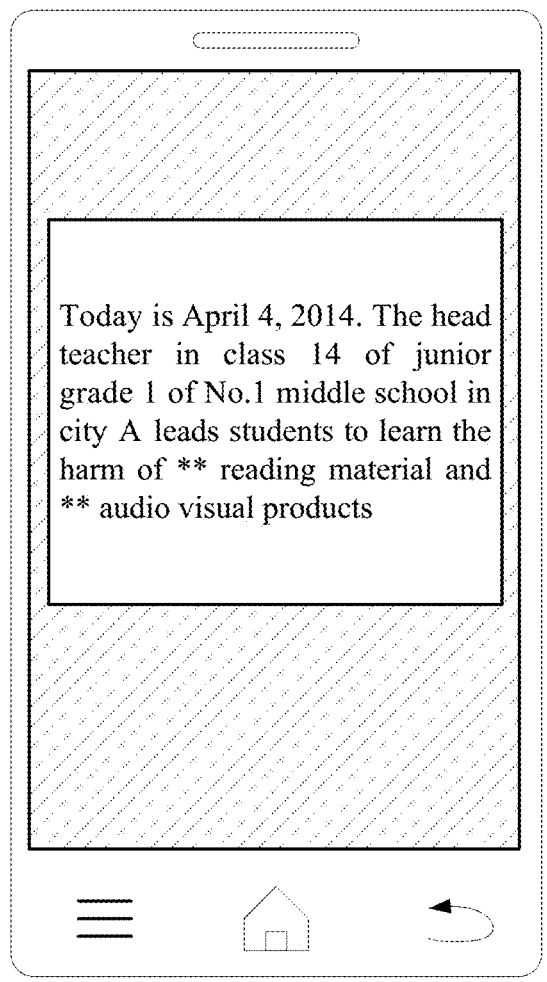
FIG. 2b is a schematic diagram of a display content shown on a terminal interface according to an exemplary embodiment.

In practical use, the target application provides a first character configuration interface, the parent inputs characters which need to be blocked from kids (that is, the first character) in the interface, a first character list is formed by the input characters and is sent to the second terminal device. The second terminal device stores the first characters in the list. When the second terminal device detects that the content to be displayed includes the predetermined first character, it may process the first character in the content to be displayed with a special displaying effect, for example, the first character is replaced by "*", and then displayed on the second terminal device, as shown in FIG. 2b.

Optionally, in the embodiment of the disclosure, the kid's parent may be informed of some characters displayed on the second terminal device. The corresponding process may be: when detecting that the content to be displayed in the target application includes the predetermined first character, the content to be displayed is sent to the first terminal device. The method in the embodiment may be used in the wireless terminal devices.

Figure 2C:
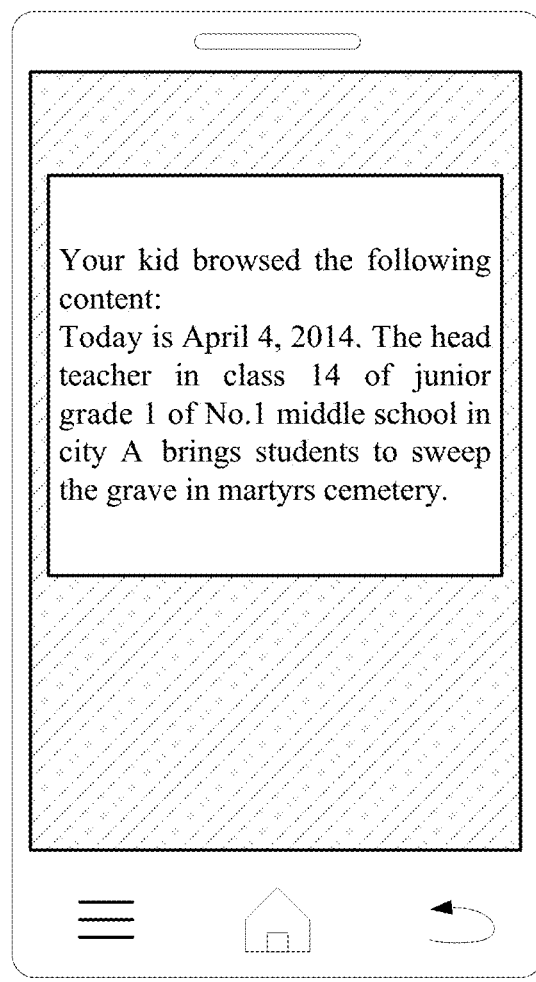
FIG. 2c is a schematic diagram of a display content shown on a terminal interface according to an exemplary embodiment.

In practical use, the target application provides the first character configuration interface, the parent inputs characters, which need to be blocked from kids, and the first character list is formed by the input characters and sent to the second terminal device. The second terminal device stores the first characters in the list. When the content to be displayed in the second terminal device includes the first characters in the first character list, the second terminal device sends the content to be displayed to the first terminal device, in which case, the second terminal device may send the displayed whole page to the first terminal device, or the second terminal device may send the whole paragraph or sentence in which the corresponding character is located to the first terminal device, as shown in FIG. 2c.

Optionally, in the embodiment of the disclosure, it is also possible to report specific operations of the kids on the application. The corresponding process may be: when detecting that an operation executed by the target application meets a predetermined reporting condition, sending a content of the operation to the first terminal device. The method in the embodiment may be used in the wireless terminal devices.

Figure 2D:
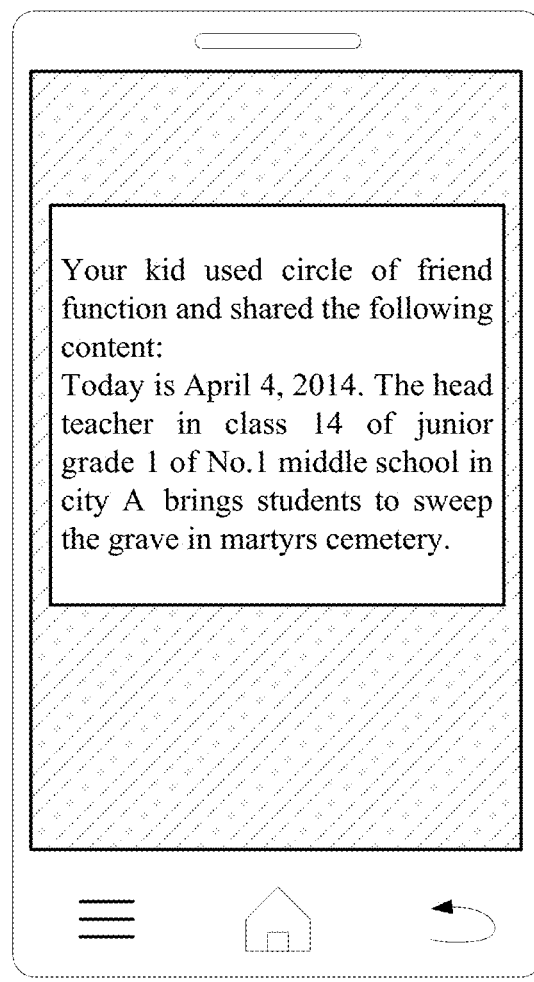
FIG. 2d is a schematic diagram of a display content shown on a terminal interface according to an exemplary embodiment.

In practical use, the reporting condition may be set by the parent in the first terminal device and transferred to the second terminal device for recording purpose. There may be various reporting conditions, such as communicating with a specified contact, or executing an add contact operation, and so on. When the operation executed by the application in the second terminal device meets the predetermined reporting condition, the second terminal device sends the content of the operation to the first terminal device, as shown in FIG. 2d. For example, the second terminal device sends message content of an instant messaging to the first terminal device, or sends shared content in circle of friends to the first terminal device.

For example, the reporting condition is a communication with a specified contact. When the login account (that is the kid's account) of the second terminal device communicates with the specified contact, the second terminal device sends the corresponding communicating content to the first terminal device.

Optionally, the predetermined reporting condition may be executing a specified predetermined function in the application. The corresponding process may be: when detecting that the target application executes a predetermined first function, an executing content of the first function is sent to the first terminal device.

In practical use, the first function may be set in the first terminal device by the parent and is sent to the second terminal device, and the second terminal device stores the first function, and when the second terminal device detects that the target application executes the first function, it sends the executing content of the first function to the first terminal device. For example, the first function may be the instant messaging function, and the corresponding executing content may be the content of a message, or the first function may be the add contact function, and the corresponding executing content may be the contact information of a target contact which is added as a contact.

Optionally, in the embodiment of the disclosure, it is also possible to restrict the contact of the kid's messaging, the corresponding process may be as follows.

In the first step, an allowed messaging contact list or a prohibited messaging contact list is received from the first terminal device. The method of the embodiment may be used in the wireless terminal devices.

In practical use, a page of parent control function may further include a button of a messaging contact setting function. The parent clicks the button and the first terminal device is triggered to obtain the contact list of the login account (that is the kid's account) of the second terminal device from a server, the contact list records the friends' contacts of the kid, the parent may select allowed messaging contacts in the contact list to form the allowed messaging contact list which is sent to the second terminal device. Alternatively, the parent may also select prohibited messaging contacts in the contact list to form the prohibited messaging contact list, which is sent to the second terminal device.

In the second step, the allowed messaging contacts according to the allowed messaging contact list or the prohibited messaging contact list.

In practical use, the second terminal device obtains the contacts in the allowed messaging contact list from the first terminal device and takes them as allowed messaging contacts, and the contacts which are not listed in the allowed messaging contact list are taken as prohibited messaging contacts. Alternatively, the second terminal device obtains the contacts in the prohibited messaging contact list, and the contacts, which are not listed in the prohibited messaging contact list, are taken as the allowed messaging contacts.

In the third step, communications between the local contact and contacts other than the allowed messaging contacts are prohibited.

Figure 2E:
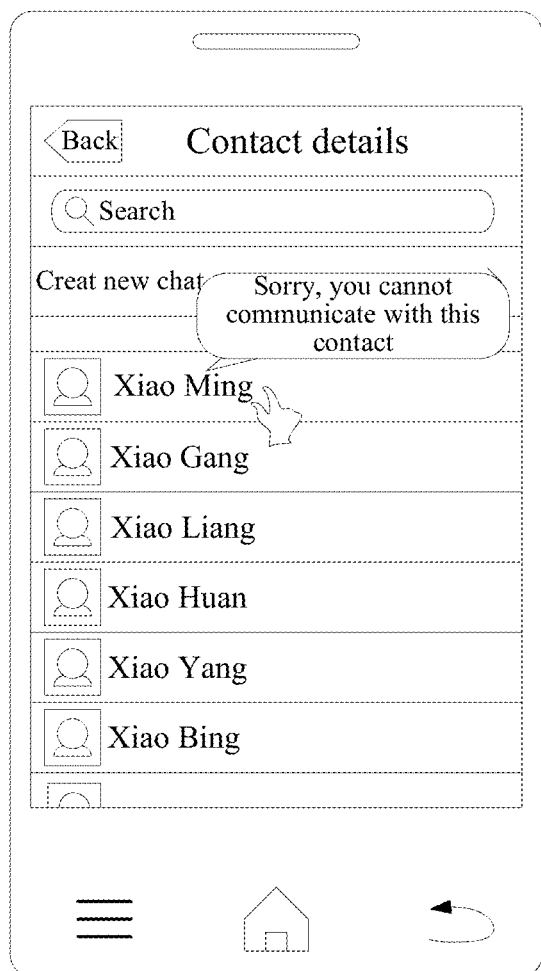
FIG. 2e is a schematic diagram of a display content shown on a terminal interface according to an exemplary embodiment.

In practical use, in the contact list of the second terminal device, it may be set to only display the allowed messaging contacts, or it may also be set to only be capable of communicating with the allowed messaging contacts. When the user of the second terminal device communicates with the contacts other than the allowed messaging contacts, the target application may popup a message window to prompt that the messaging cannot be processed, as shown in FIG. 2e.

Optionally, in the embodiment of the disclosure, it is also possible to set several restriction conditions to the kid in adding friends, the corresponding process may be as follows.

In the first step, when receiving an add contact command, attribute information of a target contact corresponding to the add contact command is obtained. The method of the embodiment may be used in the wireless terminal devices.

The target contact corresponding to the add contact command is a contact that the kid intends to add. The attribution information may be age, school, sex, job or other information of the target contact.

In the second step, if the attribution information of the target contact meets a predetermined adding condition, the target contact is added as a contact; and if the attribution information of the target contact does not meet the predetermined adding condition, the add contact command is rejected. The method of the embodiment may be used in the second terminal device.

Figure 2F:
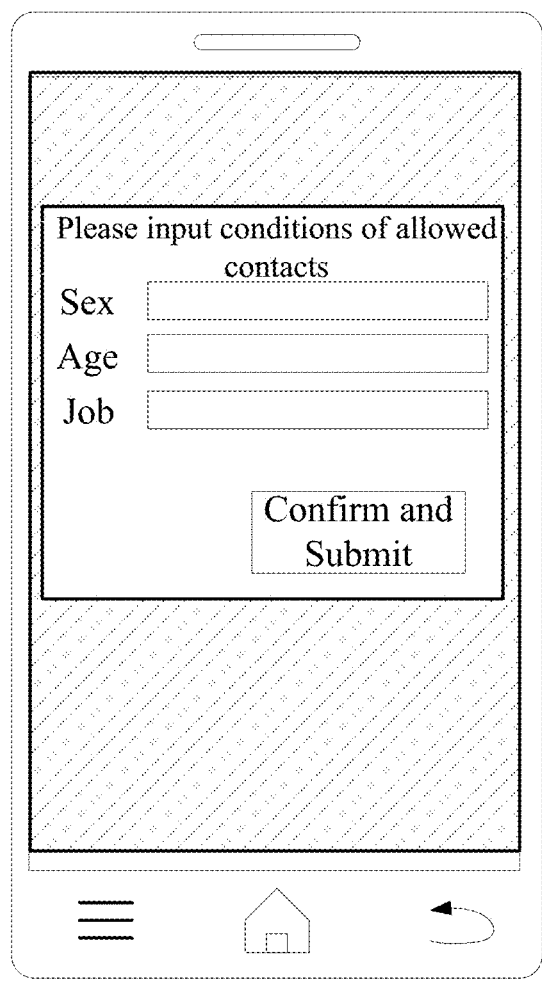
FIG. 2f is a schematic diagram of a display content shown on a terminal interface according to an exemplary embodiment.

In practical use, the parent may set adding conditions in the first terminal device, as shown in FIG. 2f, and the conditions may be sent to the second terminal device to store. For example, the adding condition may be the target contact being in the same school as the kid, the age being in a certain range and so on. The adding condition may be set to be hidden from the kid. When other user requests to add the kid's contact as a contact and the kid agrees, or the kid on his or her own adds the contact of other user as a contact, the second terminal device may receive the add contact command inputted by the kid, if the attribution information of the target contact to be added meets the adding condition, the target contact is added as a contact; if the attribution information of the target contact does not meet the adding condition, the target contact is rejected as a contact.

Optionally, in the embodiment of the disclosure, the parent may examine and approve when the kid adds friends, the corresponding process may be as follows.

In the first step, when receiving the add contact command, a contact identification of the target contact corresponding to the add contact command is obtained, and an add contact request with the contact identification is sent to the first terminal device. The method of the embodiment may be used in the wireless terminal devices.

Figure 2G:
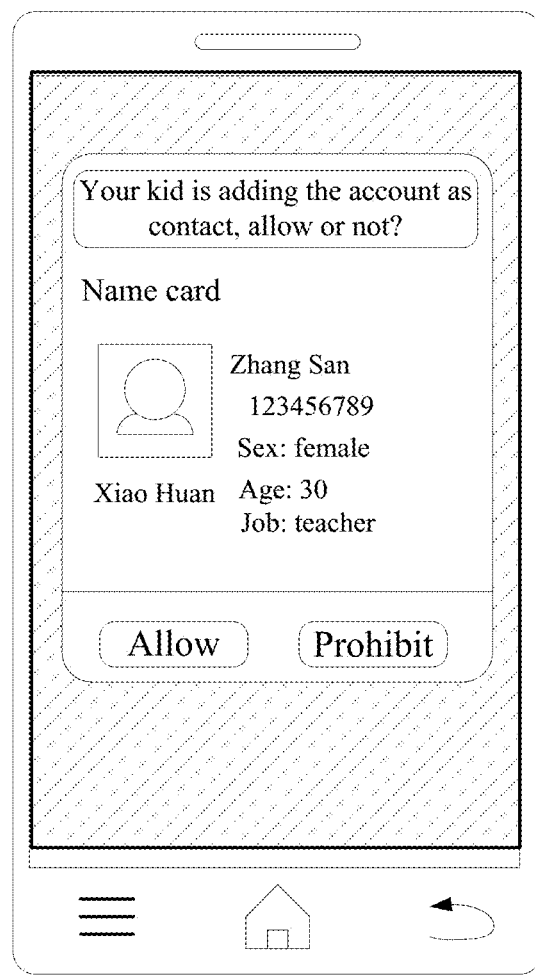
FIG. 2g is a schematic diagram of a display content shown on a terminal interface according to an exemplary embodiment.

In practical use, when a contact request to add the kid's contact as a contact and the kid agrees, or the kid on his or her own adds the contact as a contact, the second terminal device may receive the add contact command inputted by the kid, at that moment the second terminal device may obtain the contact identification of the target contact corresponding to the add contact command, and send the add contact request with the contact identification to the first terminal device; the request may carry the contact information of the target contact, such as sex, age, school and so on, as shown in FIG. 2g.

In the second step, the target contact is added as a contact when receiving the allowed information from the first terminal device; or the add contact command is rejected when receiving the rejected information from the first terminal device.

In practical use, when the first terminal device receives the add contact request with the contact identification, it may display an add contact request window which may display the contact identification of the target contact as well as the corresponding contact information, and which may also display an allowed adding button and a prohibited adding button. If the parent allows, he or she may click the allowed adding button to trigger the first terminal device to generate allowed information and send to the second terminal device; or, if the parent rejects, he or she may click the prohibited adding button to trigger the first terminal device to generate reject information and send to the second terminal device.

Optionally, in the embodiment of the disclosure, other than showing the allowed functions, it is also possible to display other functions, and the parent may examine and approve the usage of the kid to the other functions. The corresponding process may be as follows.

In the first step, functions other than the allowed functions in the target application are displayed. The method in the embodiment may be used in the wireless terminal devices.

In practical use, after determining the allowed functions in the target application in step 102, the functions other than the allowed functions in the target application may be further determined, and then the other functions are also displayed. During displaying, the execution buttons corresponding to the other functions and the execution buttons corresponding to the allowed functions may be displayed at different display areas respectively, or the execution buttons corresponding to the other functions and the execution buttons corresponding to the allowed functions may be displayed at their original positions.

In the second step, when receiving an executing command of a second function in the other functions, a function executing request with identification information of the second function is send to the first terminal device.

Figure 2H:
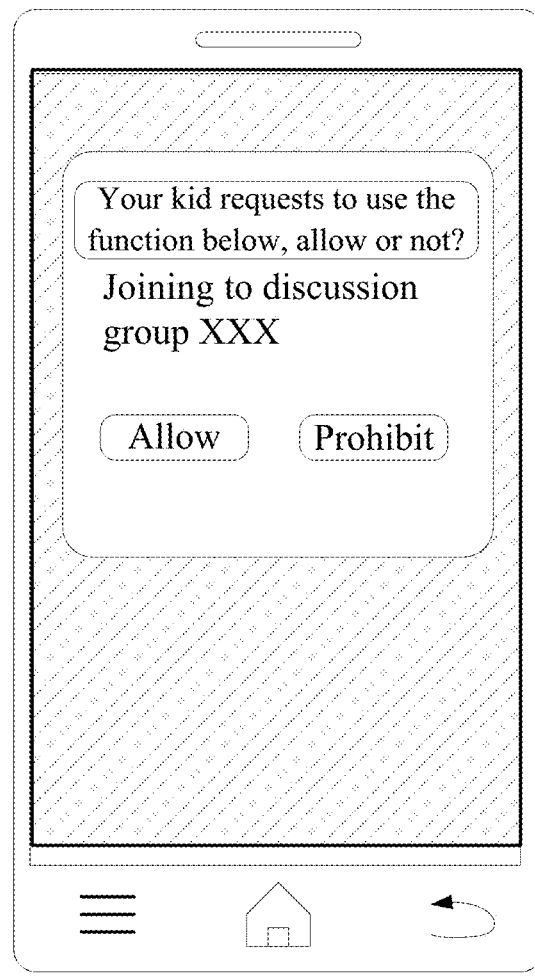
FIG. 2h is a schematic diagram of a display content shown on a terminal interface according to an exemplary embodiment.

In practical use, when the first terminal device receives the function executing request of the second function from the second terminal device, the first terminal device may display a function executing request window, the window may display the identification information of the target function, and may display an allowed button and a prohibited button, as shown in FIG. 2h. If the parent permits, he or she may click the allowed button to trigger the first terminal device to generate allowed information and send to the second terminal device; or if the parent rejects, he or she may click the prohibited button to trigger the first terminal device to generate reject information and send to the second terminal device.

In the third step, when receiving the allowed information from the first terminal device, the second function is executed; or when receiving the reject information from the first terminal device, the executing command is rejected.

Optionally, in the embodiment of the disclosure, the kid's terminal device may also report the position, route and other information to the parent's terminal device. The corresponding process may be: when a predetermined triggering event happens, the local position information or movement route information is sent to the first terminal device. The method in the embodiment may be used in the wireless terminal devices.

Figure 2I:
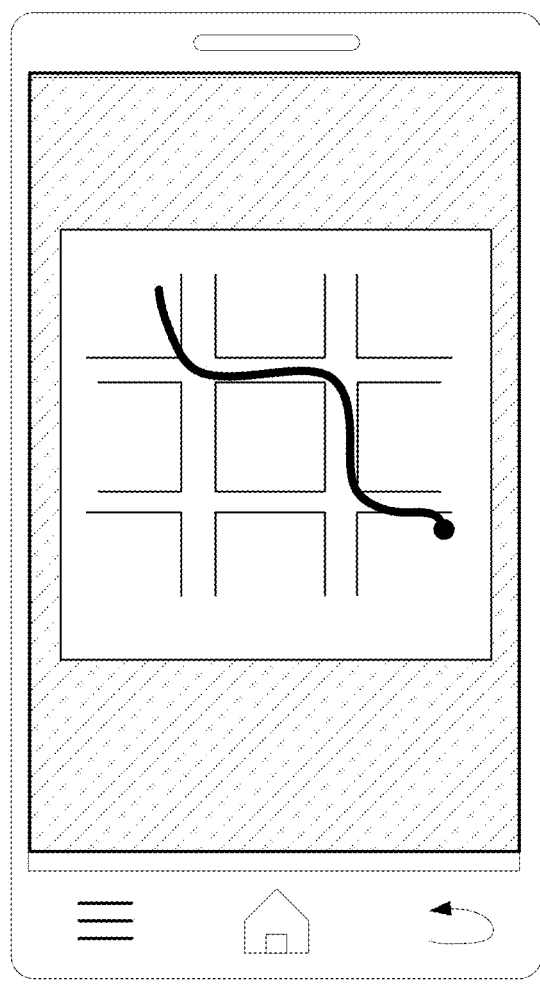
FIG. 2i is a schematic diagram of a display content shown on a terminal interface according to an exemplary embodiment.

In practical use, the triggering event may be set by the parent in the first terminal device, and may be sent to the second terminal device to record, or may be preset in the application. The corresponding triggering event may occur when reaching a predetermined time period, or reaching predetermined timing and so on. When the predetermined triggering event happens, the second terminal device may obtain the current position information and send it to the first terminal device, or may obtain the movement route information for a recent period of time and send it to the first terminal device. The first terminal device receives the position information or the movement route information, and then displays the corresponding position or the movement route on a map, as shown in FIG. 2i.

In the embodiment of the disclosure, the method includes receiving the list of allowed functions or the list of prohibited functions of the target application from the first terminal device, determining the allowed functions in the target application according to the list of allowed functions or the list of prohibited functions, displaying the allowed functions in the kid mode of the target application, and by the processing manner above, normal usage of applications are not affected in the kid mode.

Figure 3:
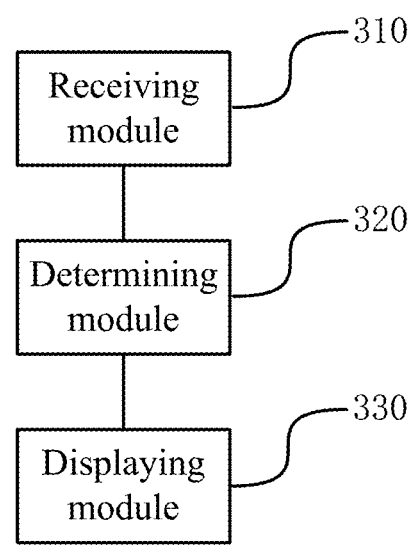
FIG. 3 is a schematic diagram of the structure of an apparatus for processing an application in the kid mode according to an exemplary embodiment.

Based on the same technical conception, the embodiment of the disclosure further provides an apparatus for processing an application in a kid mode, as shown in FIG. 3, the apparatus includes: a receiving module 310 configured for receiving a list of allowed functions or a list of prohibited functions of a target application from a first terminal device; a determining module 320 configured for determining allowed functions in the target application according to the list of allowed functions or the list of prohibited functions; and a display module 330 configured for displaying the allowed functions in a kid mode of the target application.

Optionally, when detecting that a content to be displayed in the target application includes a predetermined first character, the display module 330 is further configured to block the first character in the content to be displayed.

Optionally, a sending module is further included, when detecting that the content to be displayed in the target application includes the predetermined first character, the sending module is configured to send the content to be displayed to the first terminal device.

Optionally, a sending module is further included, when detecting that an operation executed by the target application meets a predetermined reporting condition, the sending module is configured to send the operation's content to the first terminal device.

Optionally, when detecting that the target application executes a predetermined first function, the sending module is configured to send the executing content of the first function to the first terminal device.

Optionally, a prohibiting module is further included and configured to receive the allowed messaging contact list or the prohibited messaging contact list from the first terminal device, to determine the allowed messaging contacts according to the allowed messaging contact list or the prohibited messaging contact list, and to prohibit communications between a local contact and contacts other than the allowed messaging contacts.

Optionally, an adding module is further included, when receiving an add contact command, the adding module is configured to obtain the attribute information of the target contact corresponding to the add contact command, and if the attribute information of the target contact meets the predetermined adding condition, add the target contact as a contact; if the attribute information of the target contact does not meet the predetermined adding condition, reject the add contact command.

Optionally, an adding module is further included, when receiving an add contact command, the adding module is configured to obtain a contact identification of the target contact corresponding to the add contact command, and send an add contact request with the contact identification to the first terminal device; and if allowed information is received from the first terminal device, the adding module is configure to add the target contact as a contact, and if reject information is received from the first terminal device, the adding module is configured to reject the add contact command.

Optionally, an executing module is further included, configured to display other functions than the allowed functions in the target application and when receiving an executing command of the second function in the other functions, send a function executing request with the identification information of the second function to the first terminal device; and if the allowed information is received from the first terminal device, the executing module is configured to execute the second function, and if the reject information is received from the first terminal device, the executing module is configured to reject the executing command.

Optionally, a sending module is further included, when a predetermined triggering event happens, the sending module is configured to send local position information or movement route information to the first terminal device.

In the embodiment of the disclosure, the apparatus is configured to receive the list of allowed functions or the list of prohibited functions of the target application from the first terminal device, determine the allowed functions in the target application according to the list of allowed functions or the list of prohibited functions, and display the allowed functions in the kid mode of the target application, and by the processing manner above, normal usage of the applications is not affected in the kid mode.

Figure 4:
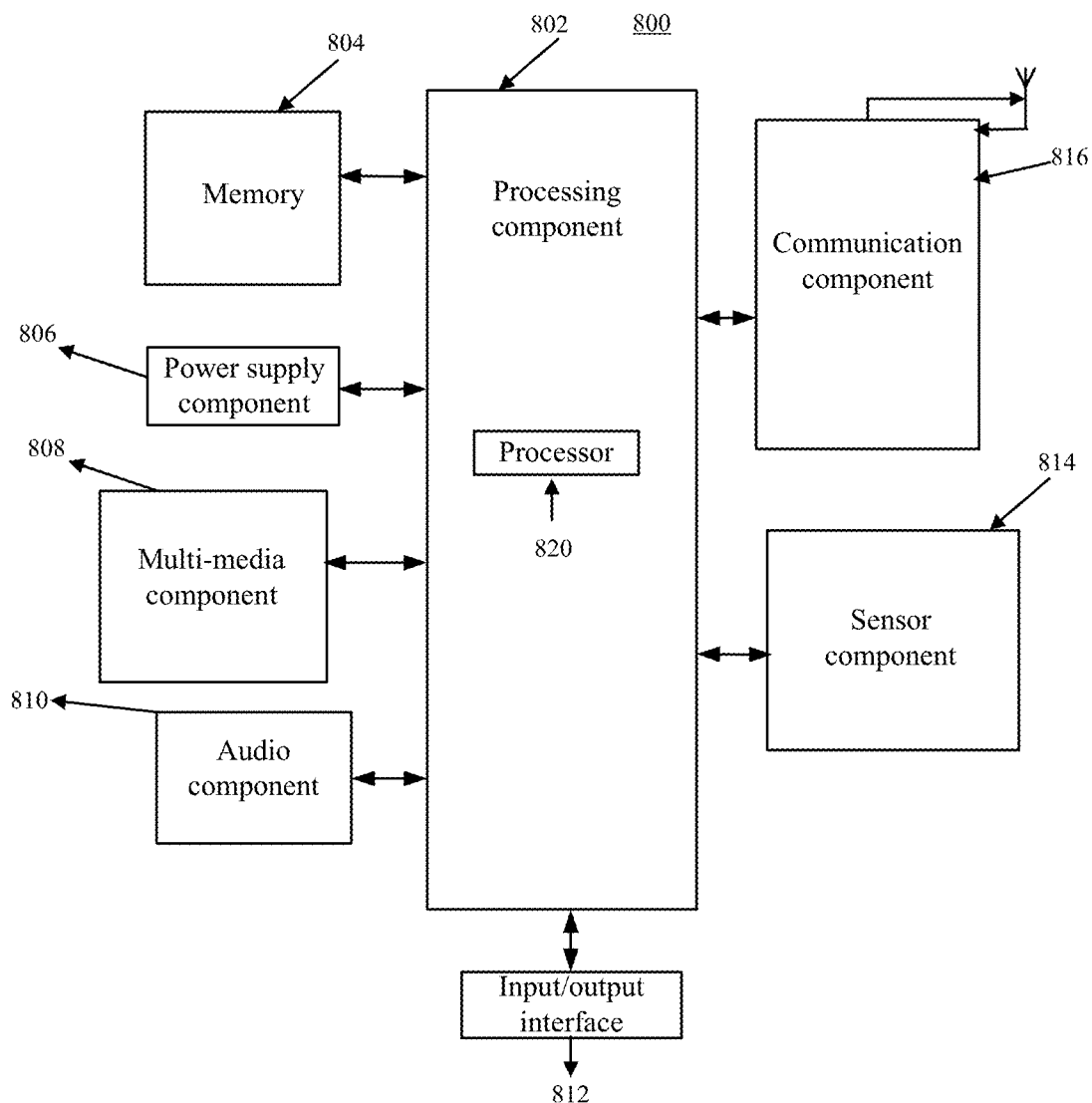
FIG. 4 is a schematic diagram of the structure of a terminal device according to an exemplary embodiment.

FIG. 4 is a block diagram of a terminal device 800 for processing an application in a kid mode according to an exemplary embodiment. For example, the terminal device 800 may be a mobile phone, a computer, a digital broadcast terminal, a message sending and receiving device, a game control center, a flat computer device, a medical device, a fitness device, a personal digital assistance and so on.

As shown in FIG. 4, the terminal device 800 may include one or more the following components: a processing component 802, a memory 804, a power supply component 806, a multi-media component 808, an audio component 810, an input/output (I/O) interface 812, a sensor component 814 and a communication component 816.

The processing component 802 usually controls the whole operation of the terminal device 800 such as operations relating to display, making call, digital communication, taking photos and recording. The processing component 802 may include one or more processors 820 to execute command to finish all or part steps of the above method. Besides, the processing component 802 may include one or more modules for facilitating the interaction between the processing component 802 and other components. For example, the processing component 802 may include a multi-media module to facilitate the interaction between the multi-media component 808 and the processing component 802.

The memory 804 is configured for storing various kinds of data to support the operation at the terminal device 800. The examples of the data may include any commands for performing applications or methods at the terminal device 800, contact data, phone book data, messages, figures, videos and so on. The memory 804 may be any types of volatile or non-volatile storage devices or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or compact disk.

The power supply component 806 provides power for components of the terminal device 800. The power supply component 806 may include power management system, one or more power supplies and other related components for generating, managing and distributing power for the terminal device 800.

The multi-media component 808 includes a screen which provides an output interface between the terminal device 800 and the user. In some embodiments, the screen may include a liquid crystal display (LCD) and a touch panel (TP). If the screen includes a touch panel, the screen may be realized to be a touch screen to receive input signals from the user. The touch panel includes one or more touch sensors to sense touch, slide and gestures on the touch panel. The touch sensor may not only sense the touch or slide boundary, but also detect the duration time and pressure of the touch and slide operation. In some embodiments, the multi-media component 808 includes a front camera and/or a back camera. When the terminal device 800 is in an operation mode, such as photo mode or a video mode, the front camera and/or the back camera may receive external multi-media data. Each front camera and back camera may be a fixed optical lens system or have the focal length and optical zoom ability.

The audio component 810 is configured for outputting and/or inputting audio signals. For example, the audio component 810 includes a microphone (MIC); when the terminal device 800 is in an operation mode such as calling mode, a record mode and a voice recognition mode, the microphone is configured for receiving external audio signals. The received audio signal may be further stored in a memory 804 or sent by a communication component 816. In some embodiments, the audio component 810 may further include a loudspeaker for outputting audio signals.

The I/O interface 812 may provide interface between the processing component 802 and peripheral interface modules. The peripheral interface modules may be a keyboard, a click wheel, a button and so on. These buttons include but not limited to a homepage button, a volume button, a start button and a lock button.

The sensor component 814 includes one or more sensors for evaluating states of different aspects of the terminal device 800. For example, the sensor component 814 may detect the on/off state of the terminal device 800, the relative locations of components, for example, the components are display and keypad of the terminal device 800. The sensor component 814 may further sense the position change of component of the terminal device 800 or the position change of the terminal device 800, whether the touch exists between the user and the terminal device 800, the direction of the terminal device 800, the acceleration/deceleration of the terminal device 800 and the temperature change of the terminal device 800. The sensor component 814 may include a proximity sensor which is configured for detecting the existence of nearby substance when no physical contact exists. The sensor component 814 may further include a light sensor such as CMOS or CCD image sensor, for using in imaging applications. In some embodiments, the sensor component 814 further includes an accelerate sensor, a gyro sensor, a magnetic sensor, a pressure sensor or a temperature sensor.

The communication component 816 is configured for communicating between the terminal device 800 and other devices in wired or wireless manner. The terminal device 800 may be connected to wireless network based on communication standard such as wireless fidelity (WiFi), 2G or 3G or their combinations. In an exemplary embodiment, the communication component 816 receives broadcast signal or broadcast related information from outside broadcast management system via broadcast channel. In an exemplary embodiment, the communication component 816 further includes a near field communication (NFC) module to prompt short range communication. For example, the NFC module may be achieved based on radio frequency identification (RFID) technology, infrared data association (IrDA) technology, ultra-wide bandwidth (UWB) technology, Bluetooth (BT) technology and other technologies.

In exemplary embodiments, the terminal device 800 may be achieved by one or more of application specific integrated circuit (ASIC), digital signal processor (DSP), digital signal processor device (DSPD), programmable logic device (PLD), field programmable gate array (FPGA), controller, micro controller, micro processor or other electronic elements for executing the method above.

In exemplary embodiments, a non-temporary computer readable storage medium with command is provided, such as memory 804 with command, the command may be executed by the processor 820 of the terminal device 800 to finish the method above. For example, the non-temporary computer readable storage medium may be ROM, random access memory (RAM), CD-ROM, magnetic tape, soft disk and optical data storage devices, etc.

A non-temporary computer readable storage medium is provided, when instructions stored in the storage medium are executed by a processor of the terminal device, the terminal device may be caused to execute a method for processing an application in a kid mode, the method includes the steps of: receiving a list of allowed functions or a list of prohibited functions of a target application from a first terminal device; determining allowed functions of the target application according to the list of allowed functions or the list of prohibited functions; displaying the allowed functions in a kid mode of the target application.

Optionally, the method further includes: when detecting that a content to be displayed in the target application includes a predetermined first character, blocking the first character in the content to be displayed.

Optionally, the method further includes: when detecting that the content to be displayed in the target application includes the predetermined first character, sending the content to be displayed to the first terminal device.

Optionally, the method further includes: when detecting that an operation executed by the target application meets a predetermined reporting condition, sending the operation content to the first terminal device.

Optionally, when detecting that the operation executed by the target application meets the predetermined reporting condition, sending the operation content to the first terminal device includes: when detecting that the target application executes a predetermined first function, sending an executing content of the first function to the first terminal device.

Optionally, the method further includes: receiving a list of allowed contact or a list of prohibited contact from the first terminal device; determining allowed contacts according to the list of allowed contact or the list of prohibited contact; prohibiting communications between a local contact and contacts other than the allowed contacts.

Optionally, the method further includes: when receiving an add contact command, obtaining attribute information of the target contact corresponding to the add contact command; if the attribute information of the target contact meets a predetermined adding condition, adding the target contact as a contact, if the attribute information of the target contact does not meet the predetermined adding condition, rejecting the add contact command.

Optionally, the method further includes: when receiving the add contact command, obtaining a contact identification of the target contact corresponding to the add contact command, and sending the add contact request with the contact identification to the first terminal device; when receiving allowed information from the first terminal device, adding the target contact as a contact; or when receiving reject information from the first terminal device, rejecting the add contact command.

Optionally, the method further includes: displaying other functions than the allowed functions of the target application; when receiving an executing command of a second function in the other functions, sending a function executing request with identification information of the second function to the first terminal device; when receiving the allowed information from the first terminal device, executing the second function, or when receiving the reject information from the first terminal device, rejecting the executing command.

Optionally, the method further includes: when a predetermined triggering event happens, sending local position information or movement route information to the first terminal device.

In the embodiment of the disclosure, the terminal device is configured to receive the list of allowed functions or the list of prohibited functions of the target application from the first terminal device, determine the allowed functions in the target application according to the list of allowed functions or the list of prohibited functions, and display the allowed functions in the kid mode of the target application, and by the processing manner above, normal usage of the application is not affected in the kid mode.

After consideration of the specification and practice of the disclosed disclosure, those skilled in the art may readily conceive other embodiments of the disclosure. This application is intended to cover any variations, uses or adaptations of the disclosure. These variations, uses or adaptations follow general principles of the disclosure, and include undisclosed common knowledge or customary technical means in this art. The specification and embodiments are considered exemplary only, and the true scope and spirit of the invention are indicated by the following claims.

It should be understood that, the invention is not limited to the above described exact structure illustrated in the accompanying drawings, and may have various modifications and changes without departing from the scope thereof. The scope of the invention is limited only by the appended claims.

What is claimed is:

1. A method for processing an application in a kid mode, comprising:
   receiving, from a first terminal device, a list of allowed functions or a list of prohibited functions of a target application;
   determining allowed functions in the target application according to the list of allowed functions or the list of prohibited functions;
   displaying the allowed functions in a kid mode of the target application;
   blocking a predetermined first character in a content to be displayed and sending the content to be displayed to the first terminal device when detecting that the content to be displayed in the target application includes the predetermined first character;
   displaying other functions than the allowed functions of the target application;
   sending a function executing request with identification information of a second function to the first terminal device, when receiving an executing command of the second function in the other functions;
   executing the second function if allowed information is received from the first terminal device; and
   rejecting the executing command if reject information is received from the first terminal device;
   obtaining attribute information of a target contact corresponding to an add contact command when receiving the add contact command, the attribute information of the target contact comprising sex, age and job;
   adding the target contact as a contact if the attribute information of the target contact meets a predetermined adding condition; and
   rejecting the add contact command if the attribute information of the target contact does not meet the predetermined adding condition;
   wherein the target application is provided with a kid mode button; the kid mode can be turned on and a password for turning off the kid mode can be set by clicking the kid mode button; and when the kid mode is turned on, the execution buttons of the allowed functions are displayed in the target application; and
   wherein when displaying the other functions than the allowed functions of the target application, execution buttons corresponding to the other functions and execution buttons corresponding to the allowed functions are displayed at different display areas respectively, or the execution buttons corresponding to the other functions and the execution buttons corresponding to the allowed functions are displayed at their original positions.

2. The method according to claim 1, wherein the method further comprises:
   when detecting that an operation executed by the target application meets a predetermined reporting condition, sending a content of the operation to the first terminal device.

3. The method according to claim 2, wherein sending the content of the operation to the first terminal device comprises:
   when detecting that the target application executes a predetermined first function, sending an executing content of the first function to the first terminal device.

4. The method according to claim 1, wherein the method further comprises:
   receiving a list of allowed contacts or a list of prohibited contacts from the first terminal device;
   determining allowed contacts according to the list of allowed contacts or the list of prohibited contacts; and
   prohibiting communications between a local contact and contacts other than the allowed contacts.

5. The method according to claim 1, wherein when receiving the add contact command, the method further comprises:
   obtaining a contact identification of the target contact corresponding to the add contact command; and
   sending an add contact request with the contact identification to the first terminal device.

6. The method according to claim 1, wherein when receiving allowed information from the first terminal device, the method further comprises:
   adding the target contact as a contact.

7. The method according to claim 1, wherein when receiving rejected information from the first terminal device, the method further comprises:
   rejecting the add contact command.

8. The method according to claim 1, wherein the method further comprises:
   sending local position information or movement route information to the first terminal device when a predetermined triggering event happens.

9. A terminal device for processing an application in a kid mode, comprising:
   a processor; and
   a memory for storing instructions executable by the processor, wherein the processor is configured to perform:
   receiving, from a first terminal device, a list of allowed functions or a list of prohibited functions of a target application;
   determining allowed functions in the target application according to the list of allowed functions or the list of prohibited functions;
   displaying the allowed functions in a kid mode of the target application;
   blocking a predetermined first character in a content to be displayed and sending the content to be displayed to the first terminal device when detecting that the content to be displayed in the target application includes the predetermined first character;

displaying other functions than the allowed functions of the target application;

sending a function executing request with identification information of a second function to the first terminal device, when receiving an executing command of the second function in the other functions;

executing the second function if allowed information is received from the first terminal device; and rejecting the executing command if reject information is received from the first terminal device;

obtaining attribute information of a target contact corresponding to an add contact command when receiving the add contact command, the attribute information of the target contact comprising sex, age and job;

adding the target contact as a contact if the attribute information of the target contact meets a predetermined adding condition; and rejecting the add contact command if the attribute information of the target contact does not meet the predetermined adding condition;

wherein the target application is provided with a kid mode button; the kid mode can be turned on and a password for turning off the kid mode can be set by clicking the kid mode button; and when the kid mode is turned on, the execution buttons of the allowed functions are displayed in the target application; and wherein when displaying the other functions than the allowed functions of the target application, execution buttons corresponding to the other functions and execution buttons corresponding to the allowed functions are displayed at different display areas respectively, or the execution buttons corresponding to the other functions and the execution buttons corresponding to the allowed functions are displayed at their original positions.

10. The terminal device according to claim 9, wherein the processor is further configured to perform:

when detecting that an operation executed by the target application meets a predetermined reporting condition, sending a content of the operation to the first terminal device.

11. The terminal device according to claim 10, wherein sending the content of the operation to the first terminal device comprises:

when detecting that the target application executes a predetermined first function, sending an executing content of the first function to the first terminal device.

12. The terminal device according to claim 9, wherein the processor is further configured to perform:

receiving a list of allowed contacts or a list of prohibited contacts from the first terminal device;

determining allowed contacts according to the list of allowed contacts or the list of prohibited contacts; and prohibiting communications between a local contact and contacts other than the allowed contacts.

13. A non-transitory computer-readable storage medium having stored therein instructions that, when executed by one or more processors of a terminal device, cause the terminal device to perform:

receiving, from a first terminal device, a list of allowed functions or a list of prohibited functions of a target application;

determining allowed functions in the target application according to the list of allowed functions or the list of prohibited functions;

displaying the allowed functions in a kid mode of the target application;

blocking a predetermined first character in a content to be displayed and sending the content to be displayed to the first terminal device when detecting that the content to be displayed in the target application includes the predetermined first character;

displaying other functions than the allowed functions of the target application;

sending a function executing request with identification information of a second function to the first terminal device, when receiving an executing command of the second function in the other functions;

executing the second function if allowed information is received from the first terminal device; and rejecting the executing command if reject information is received from the first terminal device;

obtaining attribute information of a target contact corresponding to an add contact command when receiving the add contact command, the attribute information of the target contact comprising sex, age and job;

adding the target contact as a contact if the attribute information of the target contact meets a predetermined adding condition; and rejecting the add contact command if the attribute information of the target contact does not meet the predetermined adding condition;

wherein the target application is provided with a kid mode button; the kid mode can be turned on and a password for turning off the kid mode can be set by clicking the kid mode button; and when the kid mode is turned on, the execution buttons of the allowed functions are displayed in the target application; and wherein when displaying the other functions than the allowed functions of the target application, execution buttons corresponding to the other functions and execution buttons corresponding to the allowed functions are displayed at different display areas respectively, or the execution buttons corresponding to the other functions and the execution buttons corresponding to the allowed functions are displayed at their original positions.

* * * * *